(12) United States Patent
Martinez et al.

(10) Patent No.: US 9,797,328 B2
(45) Date of Patent: Oct. 24, 2017

(54) EQUIPMENT HEALTH MONITORING METHOD AND SYSTEM AND ENGINE

(71) Applicant: Rolls-Royce Deutschland Ltd & Co KG, Blankenfelde-Mahlow (DE)

(72) Inventors: Alvaro Martinez, Berlin (DE); Luciano Sanchez, Pruvia (ES)

(73) Assignee: Rolls-Royce Deutschland Ltd & Co KG, Blankenfelde-Mahlow (DE)

( * ) Notice: Subject to any disclaimer, the term of this patent is extended or adjusted under 35 U.S.C. 154(b) by 0 days.

(21) Appl. No.: 14/972,896

(22) Filed: Dec. 17, 2015

(65) Prior Publication Data

US 2016/0177856 A1   Jun. 23, 2016

(30) Foreign Application Priority Data

Dec. 19, 2014   (EP) .................................... 14199397

(51) Int. Cl.
| | |
|---|---|
| *F01D 21/00* | (2006.01) |
| *F02D 41/14* | (2006.01) |
| *F01D 19/00* | (2006.01) |
| *F03D 7/04* | (2006.01) |
| *G05B 23/02* | (2006.01) |
| *F02D 41/22* | (2006.01) |
| *F02D 41/26* | (2006.01) |
| *F03D 11/00* | (2006.01) |

(52) U.S. Cl.
CPC ............. *F02D 41/22* (2013.01); *F01D 19/00* (2013.01); *F01D 21/003* (2013.01); *F02D 41/1404* (2013.01); *F02D 41/26* (2013.01); *F03D 7/046* (2013.01); *F03D 7/047* (2013.01); *F03D 11/0091* (2013.01); *G05B 23/0283* (2013.01)

(58) Field of Classification Search
CPC .... F01D 19/00; F01D 21/003; F02D 41/1404; F02D 41/26; F03D 7/046; F03D 7/047; F03D 11/0091; G05B 23/0283
USPC ........................................................... 701/99
See application file for complete search history.

(56) References Cited

U.S. PATENT DOCUMENTS

| | | | |
|---|---|---|---|
| 8,594,903 B2* | 11/2013 | Feeney | F01D 19/00 123/299 |
| 2005/0021212 A1* | 1/2005 | Gayme | G06N 5/048 701/99 |

(Continued)

FOREIGN PATENT DOCUMENTS

| | | |
|---|---|---|
| EP | 1705542 A1 | 9/2006 |
| WO | WO0218879 | 3/2002 |

OTHER PUBLICATIONS

Martinez, A. et al, Engine Health Monitoring for Engine Fleets using Fuzzy Radviz, IEEE International Conference on Fuzzy Systems, IEEE, Jul. 7, 2013, pp. 1-8.

(Continued)

*Primary Examiner* — Yazan Soofi
(74) *Attorney, Agent, or Firm* — Shuttleworth & Ingersoll, PLC; Timothy Klima (57) ABSTRACT

An Equipment Health Monitoring method for an engine and an Equipment Health Monitoring system for performing the method are provided. At least some of the following units are used: an Engine Simulation Unit, a Possibilistic Drift Computation Unit, a Fuzzy String Generator Unit, an Experience-based String Matching Unit and an Information Fusion and Prognosis Unit.

17 Claims, 10 Drawing Sheets

(56) References Cited

U.S. PATENT DOCUMENTS

| | | | |
|---|---|---|---|
| 2008/0120074 A1* | 5/2008 | Volponi | F01D 21/00 703/7 |
| 2008/0208487 A1* | 8/2008 | Goebel | G05B 23/0283 702/34 |
| 2011/0313726 A1* | 12/2011 | Parthasarathy | G05B 23/024 702/179 |
| 2012/0166249 A1 | 6/2012 | Jackson | |
| 2012/0179326 A1* | 7/2012 | Ghelam | G05B 17/02 701/31.9 |
| 2016/0177856 A1* | 6/2016 | Martinez | F01D 19/00 701/99 |

OTHER PUBLICATIONS

Martinez, A et al, Aeroengine Prognosis through Genetic Distal Learning applied to uncertain Engine Health Monitoring Data, IEEE International Conference on Fuzzy Systems, IEEE, Jul. 6, 2014, pp. 1945-1952.

* cited by examiner

Fig. 4B cycles

Fig. 8

| Engine #123 | | |
|---|---|---|
| | Experience | RUL |
| Cycle 1 | DTGT IS INCREASED with certainty [0.8, 0.9] OR UNCHANGED with certainty [0.1, 0.2] DP30 IS INCREASED with certainty [0.5, 0.9] OR UNCHANGED with certainty [0.1, 0.5] | 10 < RUL < 20 with confidence > 0.90 15 < RUL < 18 with confidence > 0.95 |
| Cycle 2 | DTGT IS UNCHANGED with certainty [0.5, 0.6] OR DECREASED with certainty [0.4, 0.5] DONT CARE ABOUT DP30 | |
| ... | ... | |
| Cycle N | DONT CARE ABOUT DTGT DP30 IS DECREASED | |

| Engine #124 | | |
|---|---|---|
| | Experience | RUL |
| 1 | DTGT IS INCREASED with certainty [0.5, 0.8] OR UNCHANGED with certainty [0.2, 0.5] DP30 IS INCREASED with certainty [0.8, 1.0] OR UNCHANGED with certainty [0, 0.2] | 15 < RUL < 25 with confidence > 0.90 16 < RUL < 20 with confidence > 0.95 |
| 2 | DONT CARE ABOUT DTGT DP30 IS DECREASED with certainty [0.1, 0.5] OR UNCHANGED with certainty [0.5, 0.9] | |
| ... | ... | |
| N | DTGT IS INCREASED with certainty [0.8, 0.9] OR UNCHANGED with certainty [0.1, 0.2] DP30 IS INCREASED with certainty [0.6, 0.9] OR UNCHANGED with certainty [0.1, 0.4] | |

| Engine #125 | | |
|---|---|---|
| | Experience | RUL |
| 1 | DONT CARE ABOUT DTGT DP30 IS DECREASED with certainty [0.9, 1.0] OR UNCHANGED with certainty [0, 0.1] | 10 < RUL < 15 with confidence > 0.90 12 < RUL < 13 with confidence > 0.95 |
| 2 | DONT CARE ABOUT DTGT DP30 IS DECREASED with certainty [0.9, 1.0] OR UNCHANGED with certainty [0, 0.1] | |
| ... | ... | |
| N | DONT CARE ABOUT DTGT DP30 IS DECREASED with certainty [0.9, 1.0] OR UNCHANGED with certainty [0, 0.1] | |

EQUIPMENT HEALTH MONITORING METHOD AND SYSTEM AND ENGINE

CROSS-REFERENCE TO RELATED APPLICATION

This application claims priority to European Patent Application EP14 199 397.2 filed Dec. 19, 2014, the entirety of which is incorporated by reference herein.

BACKGROUND

The invention relates to an equipment health monitoring method, an equipment health monitoring system and an equipment.

In engines like e.g. turbo turbines for aircraft full authority digital engine control (FADEC) and Equipment Health Monitoring (EHM) systems as such are known.

A FADEC system controls the turbo engine primarily for a safe and economically optimized operation. Therefore, the FADEC system collects a large number of flight data, e.g., such as air density, throttle lever position, engine temperatures, engine pressures. This system generally collects data through many channels which are available to the operating crew, and/or is automatically available for the control of the turbo engine.

The purpose of an EHM system is different. One purpose of the EHM system is to help with the long-term scheduling of turbo engine maintenance, e.g., determining the required level of turbo engine maintenance after a certain threshold of operating hours. The data available for assessment is called Engine Health Monitoring data or EHM.

EHM assessment and prognostic methods and systems which allow an efficient management of engines in general (e.g., combustion engines) and in particular turbo engines are therefore important.

This EHM data may vary from system to system and engine to engine. Furthermore, the EHM data does not necessarily have to be available to the flight crew, as these are long-term assessments which may be carried out off-line. The EHM is not limited to aircraft turbo engines but can be used in other engines as well, where data is monitored.

Existing stochastic EHM assessment and prognostic methods have typically overcome the EHM variability through the understanding that a probability distribution can be defined over the differences between measured EHM data and assumed or correlated EHM noiseless data. Using this methodology, stochastic methods produce an estimate of the most likely remaining useful life.

Non-stochastic EHM assessment methods can be applied to broader categories of EHM data (see Martinez, A., Sánchez, L., Couso, I. Engine Health Monitoring for engine fleets using fuzzy radviz. 2013 IEEE International Conference on Fuzzy Systems. Hyderabad, India. DOI 10.1109/FUZZ-IEEE.2013.6622420)

State-of-the art methods exist that filter EHM data, perform a soft quantization of the filtered EHM data, and transform sequences of quantized EHM data into a fixed-length fuzzy signature of the engine. A rule-based classifier maps these fuzzy signatures to one of the possible conditions of the engine (Good, Good to Normal, Normal, Normal to High and High deterioration). The result is an assessment of the engine associated to a confidence interval that bounds the worst-case accuracy of this diagnostic with a high probability.

Stochastic and non-stochastic EHM prognostic methods exist that predict the Remaining Useful Life (RUL) of an engine. The RUL of an engine is the expected number of safe operating hours or cycles before a given level of an engine, in particular a turbo engine maintenance is required. Existing non-stochastic methods of RUL prognosis through EHM data define the RUL as the initial release life, minus the life that has been consumed. A consumption factor is developed that depends on the degree of use that weights each cycle flown as a number of hours or cycles of remaining life used. Methods exist that apply rule-based classifiers to map the fuzzy signatures defined in Martinez, A., Sánchez, L., Couso, I. Engine Health Monitoring for engine fleets using fuzzy radviz. 2013 IEEE International Conference on Fuzzy Systems. Hyderabad, India. DOI 10.1109/FUZZ-IEEE.2013.6622420, to consumption factors and output a pessimistic bound of the RU (see Martinez, A., Sánchez, L., Couso, I. Aeroengine prognosis through genetic distal learning applied to uncertain Engine Health Monitoring data. 2014 IEEE International Conference on Fuzzy Systems. Beijing, China. DOI 10.1109/FUZZ-IEEE.2014.6891678).

SUMMARY

However both of these non-stochastic methods may also result in the wrong prognosis when certain sequences of events occur. For example, two events may occur one first in the compressor and subsequently another in the turbine. Existing methods are not able to determine the order in which these have occurred, however understanding that the original damage occurred to the compressor and that the damage to the turbine is a result of the increased working conditions of the engine to compensate this damage, is of significant value to understanding the level of deterioration (the first associated to direct damage and the second to deterioration due to its utilization) and therefore the costs associated to future maintenance.

The equipment health monitoring method as described herein, the equipment health monitoring system as described herein and the equipment as described herein address this problem. At least some of the following units are used:
Engine Simulation Unit (ESU),
Possibilistic Drift Computation Unit (PDCU),
Fuzzy String Generator Unit (FSGU),
Experience-based String Matching Unit (ESMU) and an
Information Fusion and Prognosis Unit (IFPU).

In the ESU each of the signals in the EHM data is sampled at a constant rate at one or more locations of the engine. Each of the sampled signals is compared to the output of a model-based computer simulation of the engine, operating at the same working conditions or extrapolated to a standard set of conditions. The differences between the simulated values and the actual values of the sampled signals are generically called "Delta".

In the PDCU, each of the drift rates (i.e. an analog of a multidimensional derivative) of these "Delta" variables are approximated by the slopes of locally fitted straight lines. These sequences of local slopes are noisy and must be low-pass filtered. The filtering process alters the sequence of slopes in a way that depends on the chosen filter cut-off frequency. To reduce the dependence between the filter properties and the final estimation of the RUL, many filters with different cut-off frequencies are applied in parallel to the same sequences of local slopes. The outcomes of all these filters are combined by means of suitable statistical methods that produce a sequence of upper and lower bounds of the drift for each "Delta" value and for different confidence levels. Each batch of upper and lower bounds of a drift at a given time, along with their corresponding confidence levels, is regarded as a distinct possibility distribution. This is, in the PDCU many different filters of the same series of local drift rates are aggregated into a single sequence of possibility distributions of the drift rates, so called "Possibilistic Drifts".

In the FSGU, Possibilistic Drifts are subsequently replaced by interval-valued fuzzy subsets of a catalog of linguistic descriptions comprising terms such as e.g. (but not limited to) "increased", "decreased" and "unchanged", by means of a procedure called "Soft Discretization". Each of the sequences of Possibilistic Drifts becomes a string comprising a set-valued sequence of fuzzy terms.

In the ESMU, the string of fuzzy terms is compared to a comprehensive database comprising the characteristic strings of engines with different RULs. The nearest engines in the database are identified for further assessment within the IFPU.

The IFPU, in dependence of the nearest engines resulting from the comparisons carried out in the ESMU, predicts the evolution of the deterioration of the engine and estimates the RUL of the engine under test. If the nearest engines found in the matching unit have similar RULs, the predicted value is the average of the RULs of these nearest engines. In any other case, an alarm is raised and a cautious prediction spanning the range of variation of the RULs of the nearest engines is produced.

This is, the methodology enables, the understanding of the degree of deterioration of the engines, as associated to others of known condition. This way enabling a higher degree of prognosis in understanding the level of deterioration within a given time period.

In an embodiment the parameter values comprise temperature, pressure, speed, vibration, frequency, fuel flow and/or noise level. This data can readily be obtained from the engine, in particular a turbo engine, e.g. from the engine electronic control and/or the PDCU. Changes in at least one of these parameters can be used to predict the level of deterioration of the engine.

The equipment, i.e. the engine can be a turbo engine, an aircraft turbo engine, a wind turbine, a static engine, a turbine generator, an engine or generator on a boat or a combustion engine. In other cases, the equipment may not be an engine, but another system to be assessed with measured parameters.

In a turbo engine—in particular an aircraft engine—at least one of the following measurements of temperature (T), speed (N), fuel flow (FF) and/or pressure (P) values are used in the evaluation of an aircraft engine: pressure at the entry of the turbo engine (P0), pressure at the entry of the low pressure compressor (P20), exit pressure of high pressure compressor (P30), exit pressure of the low pressure turbine (P50), ambient or atmospheric temperature outside the engine (T0), temperature at the entry of the low pressure compressor, high pressure delivery temperature (T30), turbine gas temperature (TGT), temperature at the entry to the high pressure turbine (T41), low pressure shaft speed (N1), high pressure shaft speed (N2), fuel flow (FF). The N2 dataset is a preferred choice for analyzing the high pressure system in a two-shaft engine.

In a further embodiment the parameter values are measured at the same points of a flight profile, in particular at a stable phase of cruise, just after take-off and/or just after reaching climb.

The signal generated in dependence of the pattern comprises in one embodiment an automatic notification about a level of maintenance, a level of deterioration, a time until a certain level of deterioration or a cost assessment. This may determine the requirement or otherwise for an engine or system maintenance within a given period of prognosis. The assessment may also be used to determine the most likely remaining time on-wing until a certain level of deterioration and or level of maintenance is reached. With this signal it is possible to, e.g., automatize at least a part of the maintenance schedule of an engine or the management of a fleet of engines.

In a further embodiment the engine simulation filter unit comprises a computer model of the engine that simulates the measured EHM data at the same or different working conditions.

In another embodiment, each EHM signal is subjected to a least squares local fitting of straight lines to delta variables and parallel filtering of the slopes of these lines by means of different low-pass filters, followed by an aggregation of the filtered values into a sequence of possibility distributions of the drift of the EHM Signal.

In another embodiment, a soft discretization is used to transform the possibilistic drift rate into a chain of fuzzy terms describing the temporal evolution of the differences between measured and theoretical (model based) EHM data.

In another embodiment, genetic learning algorithms are used in order to process EHM data of a large sample of engines in order to generate a knowledge database of time specific sequences associated to specific levels or types of deterioration. These sequences are combinations of key changes mixed with other sequences that are deemed not to be relevant to the associated type or level of deterioration. The genetic learning is oriented to simplify the knowledge base and remove the redundant parts this way avoiding that the experience-based string matching unit finds false matches.

In another embodiment each chain in the genetically pruned database is matched to the chain computed for the engine under test and the closest sample engines are identified.

The distance between engines is computed with a fuzzy generalization of the weighted Levenshtein distance between their corresponding chains, which is the minimum-weight series of single fuzzy term edit operations (for instance, but not limited to, insertions, deletions or substitutions) that transform one chain into other.

The Levenshtein distance is a known method for determining a distance between strings. Changing a string "CAT" into "SAT" takes the change of one letter ("C" into "5") so the distance is 1.

If weights are introduced, a Levenshtein algorithm can use a penalty for changing a letter in the string or I have a penalty for removing the letter, in order to reach a common denominator. If the Levenshtein distance is computed on weighted fuzzy data, we know of a certain probability associated against each of the cases, and as such, we can use all of this data, to use as a baseline, i.e, we now that a string "CAT" occurs 80% of the time and a string "SAT" 40% of the times. Then the distance from any other word to this baseline can be determined, by considering the distance to "CAT" and weighting it by 80% and then adding this to the distance to "SAT" and weighting it by 40%.

The Levenshtein distance can computed on weighted fuzzy data with interval valued possibilities. These are the FSGU output, when one is not sure if e.g. it really is the string "CAT", or "SAT", and the probability associated to each one is also unclear but within a certain range. In order to determine the distance, one then needs to determine the distance to each type, and each probability, for all of the possible combinations of probabilities between the terms.

In another embodiment the RULs of the nearest engines in the database are combined to carry out a prognostic assessment of engines based on a most likely or similar level of deterioration rate of change, based on a service knowledge database of engines previously assessed in the same form.

In a further embodiment the temporal sequence of the measured at least one parameter value is used by the engine simulation unit, the possibilistic drift computation unit, the fuzzy string generator unit, the experienced-based string matching and or/or the information fusion and prognosis unit. The temporal sequence could e.g. comprise information in gaps or certain patterns in the measured values indicating certain operation conditions.

The problem is also solved by an Equipment Health Monitoring system with the features as described herein.

The invention also relates to an equipment such as an engine, in particular an aircraft turbo engine, designed to interact with an Equipment Health Monitoring system as described herein.

BRIEF DESCRIPTION OF THE DRAWINGS

Embodiments of the invention are described in an exemplary way in the following figures.

DETAILED DESCRIPTION

One of the main types of engine faults or causes of deterioration are mechanical issues. Mechanical faults are mainly identified through overall engine deterioration and the assessment of EHM data.

Independently of the turbo engine 100 or of the component that has deteriorated there are several stages or levels of deterioration where the effect on cost and severity for continuous operation vary. This is, throughout the initial utilization any component or turbo engine will deteriorate over time solely due to its use, however, if subject to an inspection, it would be identified to still be good for further operation without maintenance. Continuous operation will deteriorate the component or turbo engine to a point at which, if inspected, the component or system would need to be repaired.

Ultimately, the level of deterioration of the component will reach a point where it will no longer be repairable. This condition in many cases is still safe for continuous operation as it does not result in a hazardous operation. But in many cases operation and maintenance costs will increase as the component or system is deteriorated and parts will need to be replaced at the maintenance shop visit.

In some cases if not inspected, the component may deteriorate further. In these cases further engine running may be deemed as unreliable or material may even be released. In these cases high operational disruption and high maintenance costs are incurred as not only must the initial component be replaced but all of the secondary damage caused must also be repaired or components replaced. In addition, the maintenance of the aircraft and of the engine need to be accommodated outside of the planned schedule, increasing the overhaul costs. However, the main issue in these situations is customer dissatisfaction and company reputation.

Figure 1:
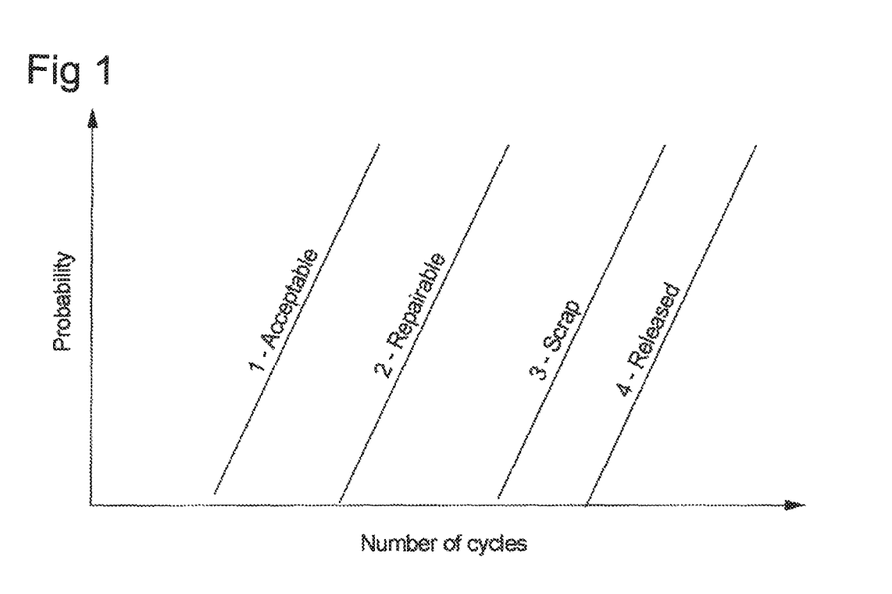
FIG. 1 shows schematically the deterioration of a component or a system.

The deterioration beyond repair can be explained in connection with FIG. 1 showing a Weibull representation of component or system deterioration over time through the phases "acceptable", "reparable", "scrap", and "released".

Substantial changes and the current FADEC systems capability only pick up the last two lines of the graph ("scrap", "released").

The method and system described below, helps in determining the status of the engine 100 regarding the other two lines and its progression towards the higher levels of deterioration. FIG. 1 is understood to provide a generic view.

It is important to establish that there is a broad gap between new and failed and that understanding these differences will enable an optimized reliability, planning and associated costs. This is, understanding the probability of sustaining a certain level of deterioration within a given timeline. Through the understanding of the level of deterioration, the shop capacity and shop visit requirements may be optimized.

In the following, some embodiments of a turbine EHM system are described which take into account amongst other things the operation of a turbo engine 100 compared to historic data from the same type of turbo engines 100 or even different types of turbo engines 100. The embodiments are turbo engines 100 from aircrafts. The EHM system described herein can also be used to manage other turbo engines 100 like, e.g., stationary gas turbines or combustion engines like a diesel engine. Other examples are wind turbines, where the wind speed, the efficiency or the bearing temperatures may be measured.

Figure 2:
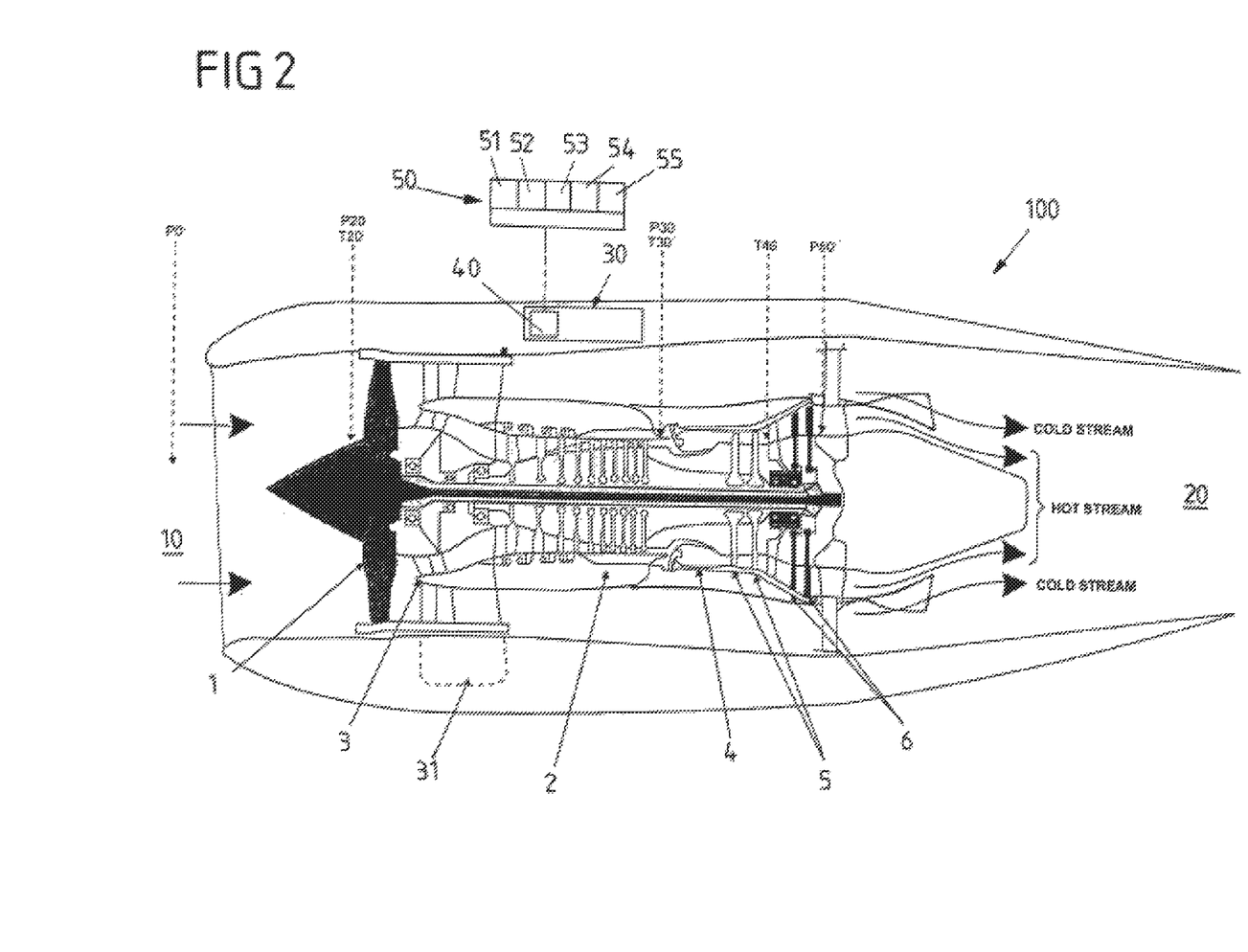
FIG. 2 shows a cross section view of an aircraft turbo engine with the sensors for obtaining data for an embodiment of the EHM system.

In FIG. 2 an overview of a typical aircraft turbo engine 100 is shown as an example for an engine 100. In particular, FIG. 2 schematically shows sensor locations which provide an input to the sensor system of the EHM, further variables and or locations may be considered depending on the system or engine under assessment, and the assessment requirements.

The measurement data can at least in part be taken from the measurements obtained from the FADEC.

In the following, the measurement of different temperatures and pressures at different locations of the turbo engine 100 is described. The measurement of this data as such is known. The embodiment of the EHM system described here uses this data in a particular way which will be described below. Temperature and pressure are just examples of measurable parameter values. In other embodiments speed, vibration, frequency and/or noise data could be used as parameters.

At an air inlet 10 air is fed into the turbo engine 100. The pressure P0 is measured outside the turbo engine 100. The pressure P20 and the corresponding temperature T20 are measured—in air flow direction—before a turbofan 1 which is a low pressure compressor with one stage. In air flow direction behind the turbofan 1 is a high pressure compressor 2 which in this embodiment has ten stages. The air flow behind the turbofan 1 is divided by an air splitter nose 3. The inner part of the air flow enters the high pressure compressor 2. The outer part of the air flow, the bypass stream leaves the turbo engine 100 at an air outlet 20 at the rear end.

The pressure P30 and the temperature T30 are measured after the last stage of the high pressure compressor 2.

After leaving the high pressure compressor 2, the air enters an annular combustor 4. The hot air leaving the annular combustor 4 is driving a high pressure turbine 5 which in this embodiment has two stages. At the exit of the high pressure turbine 5 the temperature T46 is measured. The compressor and turbine stages are equipped with blades for interaction with the flowing air. The space between the tip of a blade and the casing of the turbo engine 100 is the clearance. The area in the turbo engine 100 radially opposite the blades can be covered by a liner.

After leaving the high pressure turbine 5, the air drives a low pressure turbine 6 which in this embodiment also has two stages. At the exit the pressure P50 is measured before the air, coming from the last stage of the low pressure turbine 6 is mixed with the bypass stream and exits the turbo engine 100.

Furthermore, in this embodiment a turbo engine comprises an engine electrical control 30 and a gear box 31.

In this particular embodiment temperatures and/or pressures are taken at five different locations in the turbo engine 100. In other embodiments the types of measurements, the number of measurements and/or the measurement locations in the turbo engine 100 may be different.

FIG. 2 shows just one example of an aircraft turbo engine 100 with two compressor and two turbine modules. Other aircraft turbo engines 100 have different numbers of modules, stages or a different design. Furthermore, the turbo engine 100 in FIG. 2 is just one example for an engine 100. Stationary turbo engines 100 may have a different design in detail but have a similar overall structure or function. The methods and systems described in the following can also be applied to a one or a three shaft turbo engine, turbo prop engines or combustion engines, like diesel engines. Other examples are wind turbines, stationary turbines and turbines or engines on ships and boats.

Figure 10:
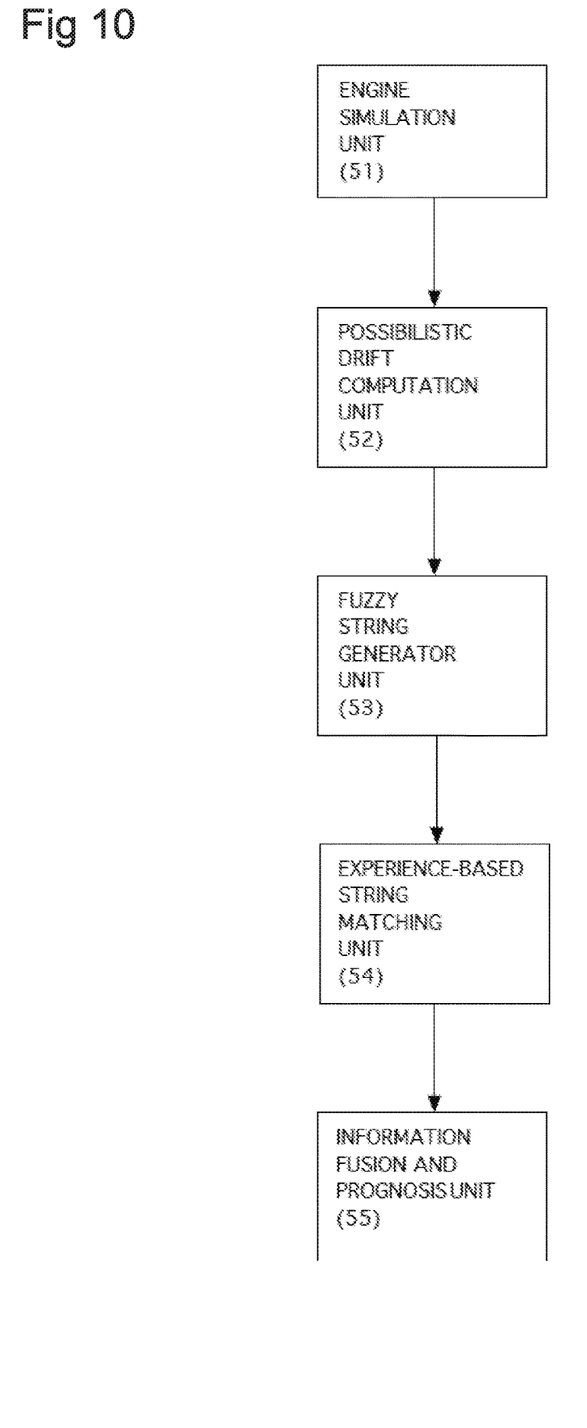
FIG. 10 showing a block diagram of an embodiment for an engine health system.

The measurements taken at the turbo engine 100 are transmitted to an engine health data processing unit 40 which in the shown embodiment is a part of the engine electronic control 30. The health data processing unit 40 is coupled to a data processing unit 50 which in this embodiment is separate from the turbo engine 100. The data processing unit 50 comprises a database with historic data. The functionality of the data processing unit 50, in particular an ESU 51, a PSCU 52, a FSGU 53, an ESMU 54 and an IFPU 55 will be described below. In FIG. 10 the sequence of the processing steps is shown for one embodiment.

Key sections of the turbo engine 100 are the high pressure compressor 2 and the high pressure turbine 5. In these units the air is compressed to the pressures required so that the fuel combustion can be optimized for improved efficiency and reduced pollution. As a consequence of this, these two engine systems are the areas where high maintenance costs are induced and deterioration occurs.

High Pressure Compressor 2 (HPC) deterioration is mainly driven by increased tip clearances, which in turn reduce the working life of the system, or by an actual material release from one of the blades or vanes. Increased tip clearances may be induced by liner loss or by reduced blade height, either way increased clearances are a sign of deterioration. An example for this is given below.

The EHM system will identify a blade release, or the release of a section of blade or vane, through the engine data and vibration, the assessment would subsequently trigger troubleshooting to determine the exact level of damage or directly require the engine removal if the level of deterioration is known to be high.

However, liner loss or long term engine deterioration is more difficult to determine and varies from engine to engine.

High pressure turbine 5 and combustor 4 deterioration may occur due to the actual combustor 4 been deteriorated, the fuel burn not been appropriate or actual blade or vane damage. Combustor 4 deterioration is mainly time driven and is not typically identified through EHM methods due to its slow deterioration over time.

Turbine blade deterioration is mainly driven by reduced cooling or actual cracking which is either seen as an efficiency improved turbine or not actually visible through EHM signatures. The methods and systems described herein can quantify these small deviations.

HPT Vane deterioration on the other hand is mainly determined to result in cracking on the airfoil to platform areas or at the trailing edge. Cracking is not visible through EHM data assessments, but NGV (nozzle guide vane) burn back deterioration is.

Although individual component deterioration assessments may not be possible in all cases, the overall engine deterioration is always reviewed. This is to assure that no significant deterioration occurs even if the origin of the deterioration is not strictly known.

This is a long-term assessment to determine the detailed understanding of different parts within the turbo engine 100 may be carried out to generate an efficient and accurate engine health management.

The turbo engine 100 performance, once the design is fully defined, may be assessed to determine the overall working conditions. Based on engineering knowledge and experience, deterioration trends may be compiled which will help determine the conditions to monitor once the engine is in service.

The purpose of the EHM is not solely the monitoring of the turbo engine 100 in operation to, e.g., calculate control values. One purpose is also to enable the long term assessment of a particular engine in comparison to other engines.

Therefore, based on the turbo engine 100 design and performance definitions, it can be shown that deterioration of the high pressure compressor 2 will show as an increase of T30, TGT (turbine gas temperature) and FF (fuel flow) with a reduction of N2 (high pressure shaft speed) and P30.

Deterioration of the high pressure turbine on the other hand would be associated with an increase of TGT and FF but a reduction in P30 and T30.

The data is stored by the EVMU (Engine Vibration Monitoring Unit. Collects e.g. all of the engine data and monitors more things than just vibration) on the aircraft and downloaded automatically or manually dependent on the aircraft/mission, customer contract, etc. The data is then sent to an assessment center where it is assessed for trends.

However, in reality both systems will deteriorate simultaneously over time. The effects of one of the systems may therefore be hidden by the other, as the trends would be combined. It is therefore key to monitor changes over time in order to keep account of which of the systems is deteriorating and to what degree before the other compensates the effect. This is, it is important to understand which system has deteriorated and which system is compensating the engine deterioration in order to understand the rate of deterioration within each module or system. As such, understanding which module is working harder will enable the understanding of the rate of deterioration. The method therefore addresses this issue through the association of each engine to a knowledge database of sequences where the level of deterioration at module level is known.

In addition, service and development experience help to quantify these step changes as in reality these trends may not always occur or may not be as clearly shown within the engine as stated by the performance definitions and models. To this effect it is shown that although high pressure compressor 2 deterioration is associated to a reduction in P30, this drop does not need to be significant, whilst the same drop in P30 associated to high pressure turbine 5 deterioration is known to be of a significant value.

The objective of this assessment is to address the area of engine data control for long term evaluation and cost, through the identification of specific levels of module deterioration for any given engine at any given time, as well as to provide a prognostic assessment of each engine module. This in turn, is determined will incur an improved engine and/or fleet level of reliability as well as provide operational benefits. This EHM assessment and prognostic system described, is centered on the off-line control data analysis typically associated to the assessments carried out at and/or by an EHM data assessment center for trend monitoring. This is rend monitoring will enable a better prediction and prognosis of the internal working conditions of the engine 100 and it is most likely development over time which is deemed will improve the fleet reliability, optimize fleet maintenance planning and reduce overhaul costs.

In addition, the assessment will address the current level of indetermination of engines with parts contained within the acceptable/repairable/scrap section of the level of deterioration understanding. The assessment will review EHM data and determine if each of the compressor and turbine systems would be acceptable or repairable if they were subject to maintenance. This way, the review of EHM data will be able to determine the level of maintenance which would be required and the level of component replacement to be expected. This understanding would directly improve the level of maintenance required and as such shop turn-around time of the engine and the availability of required parts for a given shop visit incurring a significant impact to the overall engine life cycle costs as well as provide the capability of performing trade studies between increased time on-wing and increased levels of off-wing maintenance.

Figure 3A:
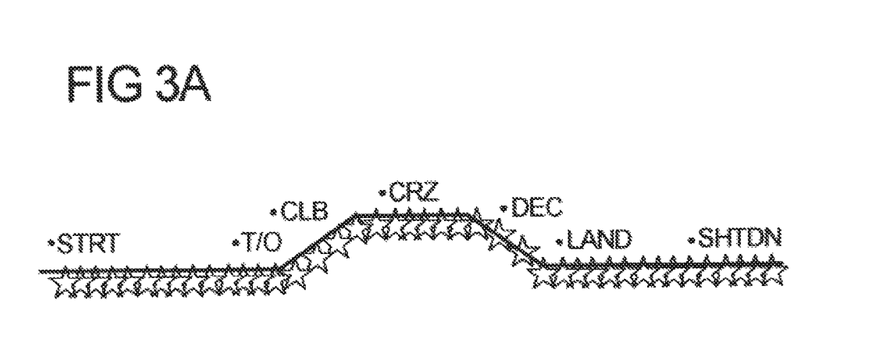
FIGS. 3A-C show three different embodiments for data gathering for an embodiment of an Engine Health Monitoring system.
Figure 3B:
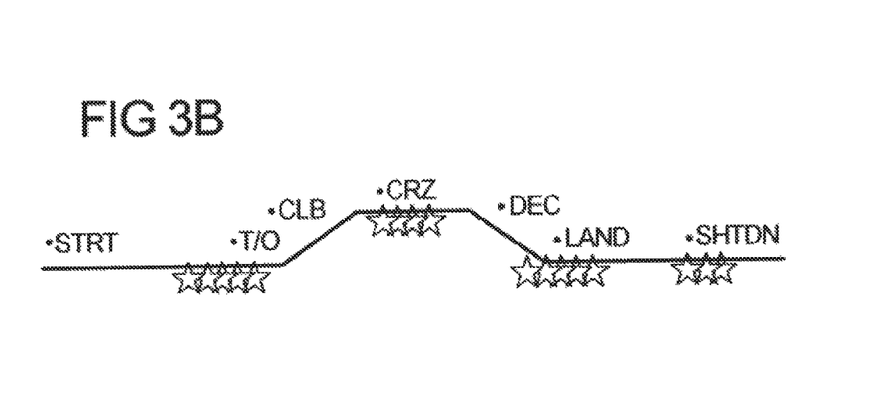
Figure 3C:
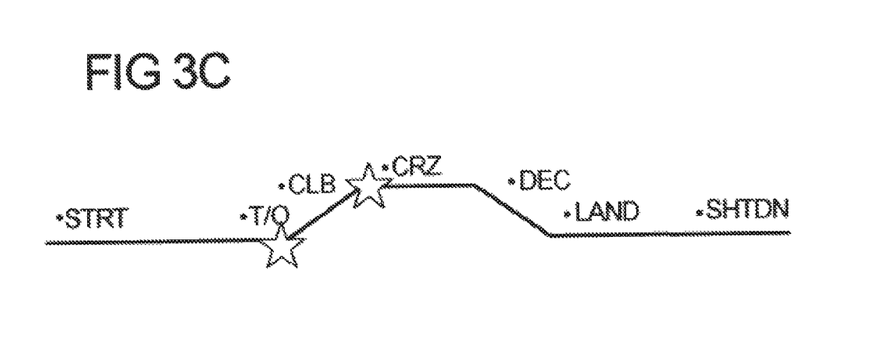

In FIGS. 3A to 3C three types of data gathering for an EHM system are shown in connection with an aircraft turbo engine 100.

In the embodiments shown in FIG. 3A data is continuously (indicated by the sequence of stars) gathered from start (STRT), take-off (T/O), climb (CLB), cruising phase (CRZ), descend (DEC), landing (LAND) and shut-down (SHTDN). This continuous data gathering requires a relatively large data storage capacity. The data processing is typically performed during the flight, i.e., on-board.

In FIG. 3B, a variation of the data sampling strategy described in FIG. 3A is shown. Here, only key phases of operation are continuously sampled, e.g., the take-off, the cruise phase, the descent, the landing and the shut-down.

In FIG. 3C, an even more reduced sampling strategy is shown. Here, only individual sampling points are used, e.g., data is sampled at the take-off point, at the end of climb and the beginning of the cruise. This sampling strategy generates significantly fewer data points which are deemed sufficient for overall engine trend understanding purposes.

For efficient turbo engine management certain measurement points and data are selected as input parameters and categorized, in particular filtered according to their trends.

Figure 4A:
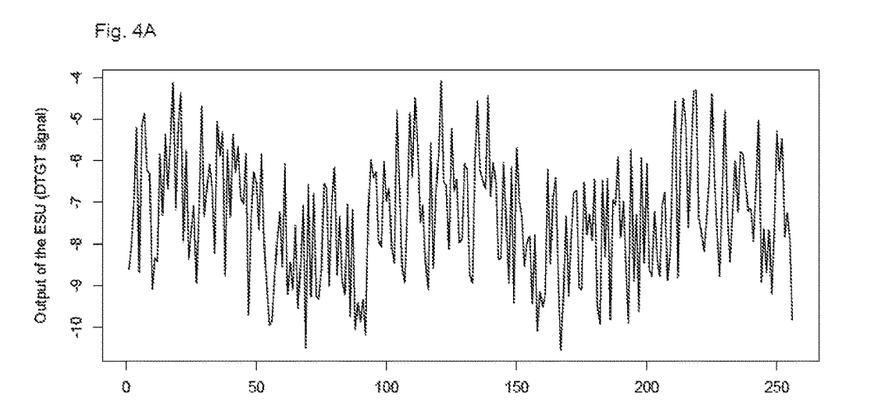
FIG. 4A, B showing raw data of a temperature (turbine gas temperature TGT) and pressure signal (P30) in the form of deviations from normal data over a number of cycles, i.e. flights.

In FIGS. 4A and B plots of data derived from raw data of the turbine gas temperature (TGT, FIG. 4A) and the pressure at the exit of the high pressure compressor 2 (P30, FIG. 4B) is shown. The data being an output of the ESU is shown as deviation (DTGT, DP30) from normal operation conditions. The data is sampled over more than 250 flight cycles, each data point representing one cycle. The data is very noisy making it difficult to find any trend over a smaller number of cycles.

Figure 4B:
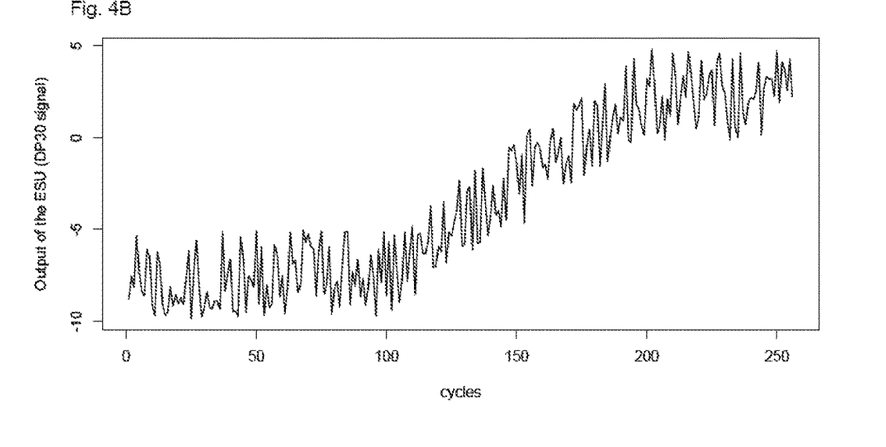

In other embodiments different signals (e.g. temperature T30 at the exit of the high pressure compressor 2, the pressure P50 at the exit of the low pressure turbine 6 and/or the pressure P20 at the entrance of the low pressure compressor 1) or combination of signals are measured and used in the further data processing.

Figure 5A:
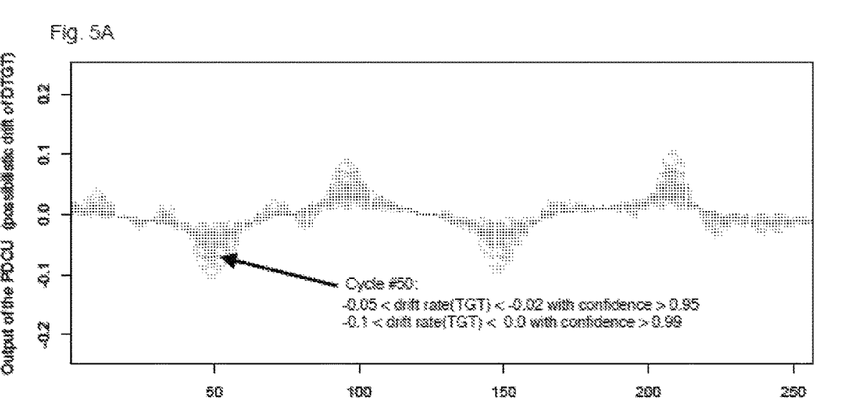
FIGS. 5A, B showing output of the PDCU of the signals in FIGS. 4A, 4B in the form of a possibilistic drifts.
Figure 5B:
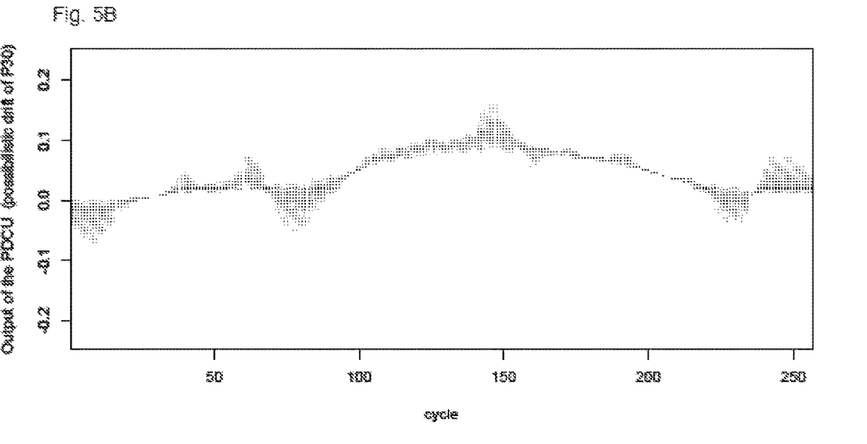

This data is fed into the PDCU resulting in the data shown in FIGS. 5A and B. FIG. 5A shows the output of the PDCU for possibilistic drift in DTGT, FIG. 5B shows the output of the PDCU for the possibilistic drift in DP30.

In the PDCU, each of the drift rates (i.e. an analog of a multidimensional derivative) of these DTGT and DP is approximated by the slopes of locally fitted straight lines. These sequences of local slopes are noisy and are low-pass filtered. The filtering process alters the sequence of slopes in a way that depends on the chosen filter cut-off frequency. To reduce the dependence between the filter properties and the final estimation of the RUL, many filters with different cut-off frequencies are applied in parallel to the same sequences of local slopes. The outcomes of all these filters are combined by means of suitable statistical methods that produce a sequence of upper and lower bounds of the drift for each DTGT and DP value and for different confidence levels. Each batch of upper and lower bounds of a drift at a given time, along with their corresponding confidence levels, is regarded as a distinct possibility distribution. This is, in the PDCU many different filters of the same series of local drift rates are aggregated into a single sequence of possibility distributions of the drift rates, so called "Possibilistic Drifts".

So for every cycle not a single value is given (like in FIG. 4A; B) but a probability information. In FIG. 5A for example for cycle 50 it is indicated that the drift rate for DTGT (i.e. the deviation of TGT) is between −0.05 and −0.02 with a confidence level of more than 95%. The drift rate for DTGT is between −0.1 and 0 with a confidence level or more than 99%. So for each data point in FIG. 4A, B the PDCU generate the probability information shown in FIG. 5A, B by using the multidimensional filtering process described above.

The same applies to the P30 signal. The possibilistic drift rate DP30 is shown in FIG. 5B.

Figure 6A:
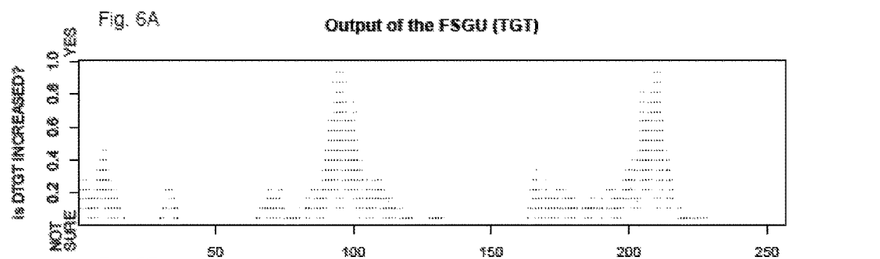
FIGS. 6A-C showing the output of the FSGU for temperature data in the form of a probability of an increase, non-change or decrease based on the output of the PDCU over a number of cycles.
Figure 6B:
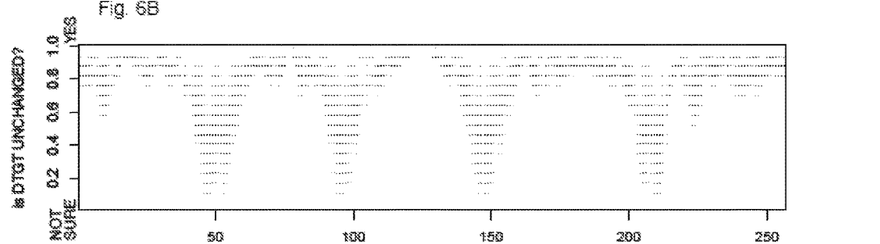

The PDCU 52 output data (see FIGS. 5A, B) is fed into the FSGU 53. The output of the FSGU 53 is shown in FIGS. 6A to 6C for the TGT data and FIGS. 7A to 7C for the P30 data.

Figure 6C:
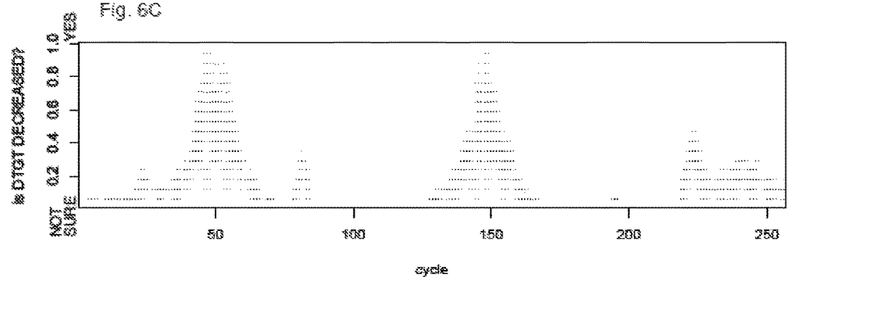
Figure 7A:
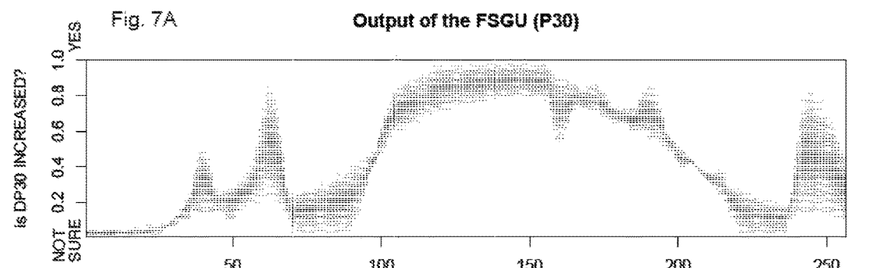
FIGS. 7A-C showing the output of the FSGU for pressure data in the form of a probability of an increase, non-change or decrease based on the output of the PDCU over a number of cycles.
Figure 7B:
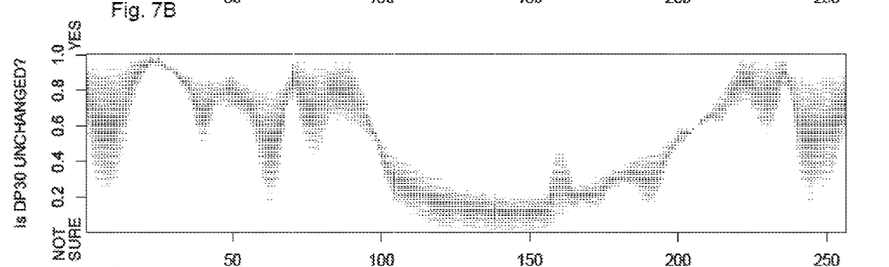
Figure 7C:
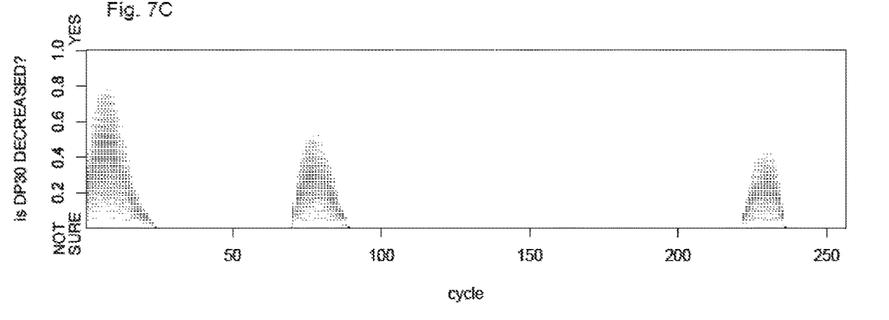

Here for each cycle the probability is calculated that the deviation data (DTGT, DP30) is increased (FIGS. 6A, 7A), unchanged (FIGS. 6B, 7B) or decreased (FIGS. 6C, 7C).

When looking e.g. at cycle 50 again it can be seen that probability of an increase of the DTGT signal is very low, essentially zero. This is consistent with FIG. 5A in which is shown that it cycle 50 the DTGT data essentially never raises above zero. The probabilities for an unchanged or decreased DTGT signal are higher. This information would not be available e.g. from the raw data shown in FIG. 4A.

Similar analysis can be made in the case of DP30 in FIGS. 7A to 7C.

Figure 8:
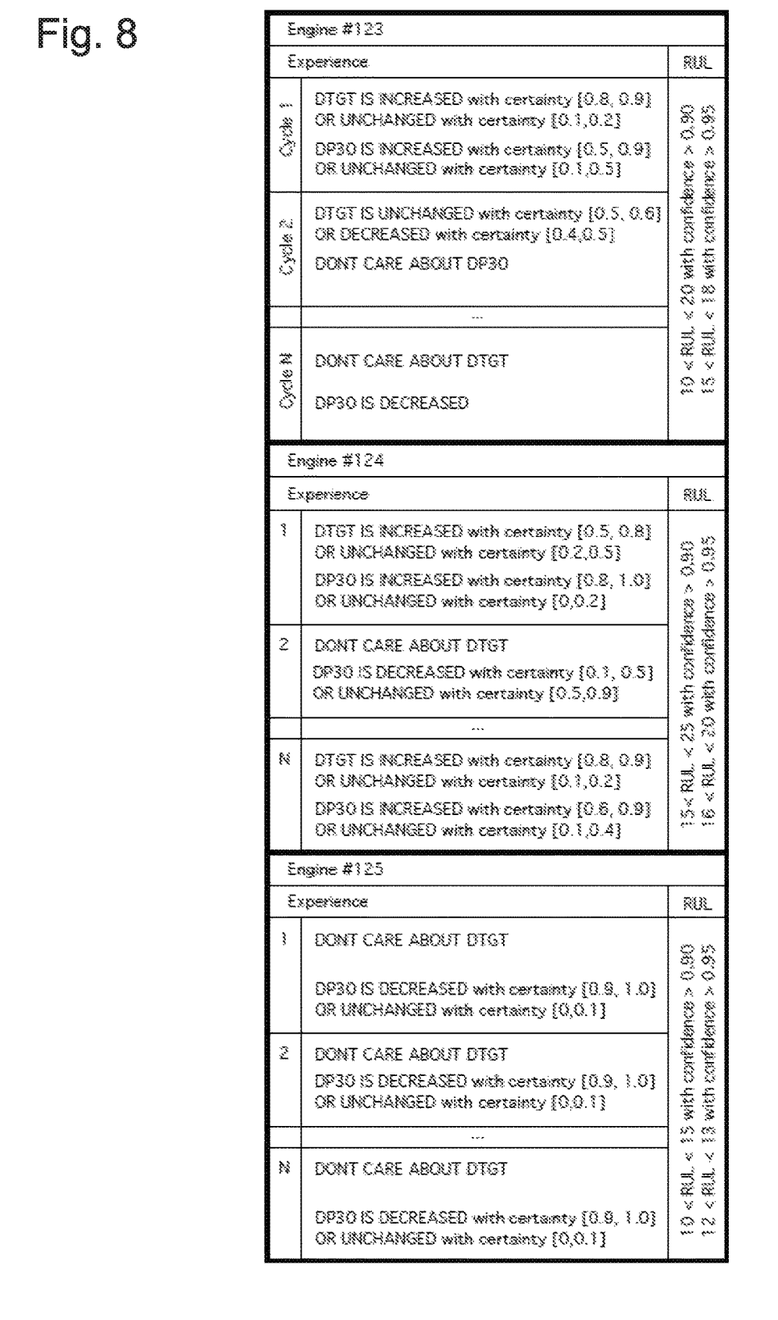
FIG. 8 showing an example of an experience data base with chance information related to individual engines.
Figure 9:
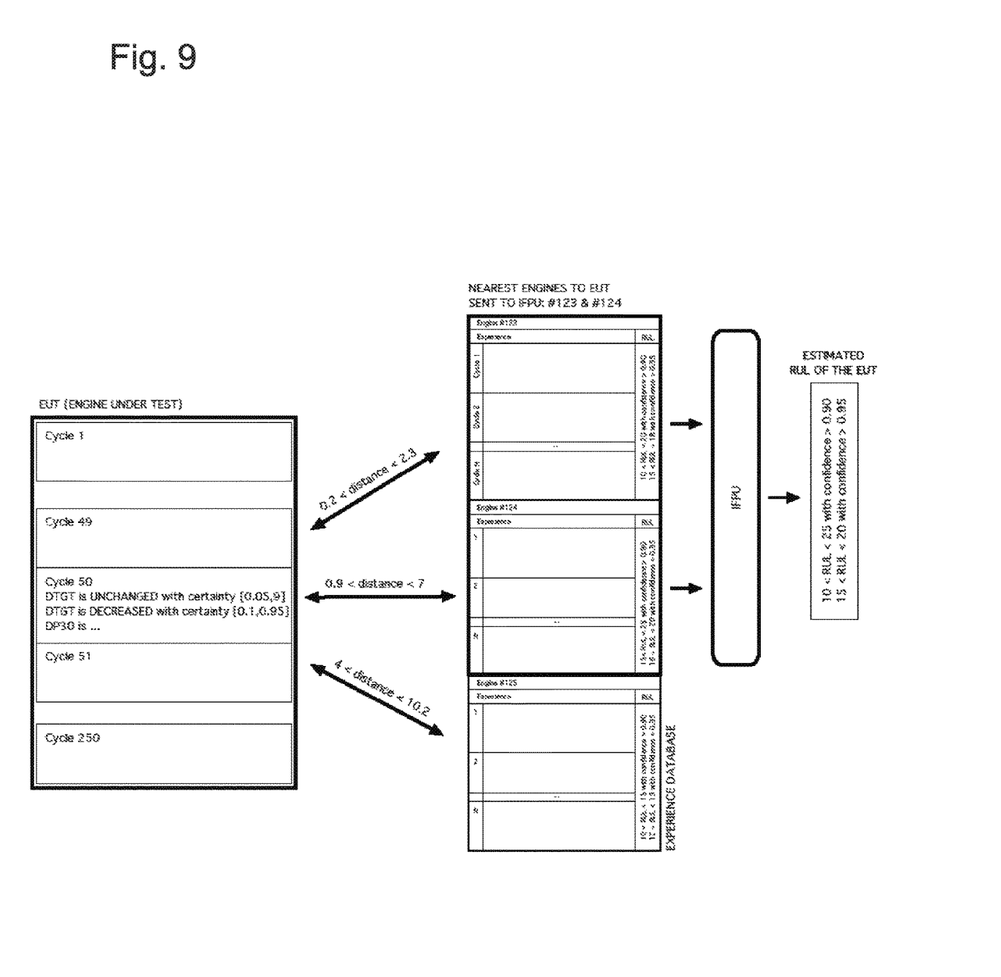
FIG. 9 showing the comparison of the experience data base with an engine under text.

In FIG. 8 a sample from an experience database is shown which is used in the further processing of the data (see FIG. 9). For three engine 123, 124 and 125 experience data has been filled in for flight cycles 1, 2 . . . N. For some flight cycles (e.g. cycle N for engine 123) it is indicated that the DTGT data is not relevant. The possibilistic drift ranges for DTGT and DP30 (see e.g. in FIGS. 5A, B) are shown in brackets. The experience results for the RUL is given for each engine 123, 124, 125 over all cycles.

In FIG. 9 the further data analysis steps are shown which are performed by the EMU 54 and IFPU 55. In the left the data for 250 cycles of the engine under test is shown. The exemplary data for cycle 50 is shown.

The experience-based string matching unit EMU 54 compares the string of terms generated by the fuzzy string generator unit with at least one other sequence or portion of sequence of previously obtained fuzzy terms (i.e. the experience database of FIG. 8 shown in simplified form in the middle of FIG. 9) in order to determine the degree of similarity to each of the database set. This is indicated by the Levenshtein distances at the double arrows in FIG. 9. The probabilities (shown in brackets in the data for the engine under text on the left in FIG. 9) can be used as weight in the computation of the Levensthein distances.

The information fusion and prognosis unit (IFPU) 55 determines in dependence of the matching patterns or portions of the patterns resulting from the comparisons carried out in the experience-based string matching unit (EMU) 54, providing a rate of engine deterioration indicating the current level of deterioration, the rate of deterioration change and the remaining useful life for a given level of deterioration or requirement or otherwise for engine maintenance or the most likely level of deterioration and the likelihood for the requirement or otherwise of engine maintenance of the engine 100 under test. This is shown towards the right in FIG. 9.

This method of assessment enables module specific prognosis assessments, as well as a higher level of understanding of the engine and module level of deterioration. The assessment against a service knowledge database of deterioration sequences, is also associated to a probability of a rate of change which may be used to understand the rate of deterioration of the engine. This is different to the current single cycle assumptions used for each cycle flow, or other assessments where artificial (or average fleet) levels of life consumption are considered. This prognostic understanding of the engine is therefore determined to provide a higher level of accuracy and is able to assess complete as well as subsections of engine data sets in order to provide specific different rates of change in the levels of deterioration of an engine throughout its life.

The invention has been exemplarily described in connection with an aircraft turbo engine 100. In principle the method and the system can be used for other engines, e.g., combustion engines 100 as well.

It should be understood that the above description is intended for illustrative purposes only, and is not intended to limit the scope of the present disclosure in any way. Thus, those skilled in the art will appreciate that other aspects of the disclosure can be obtained from a study of the drawings, the disclosure and the appended claims. All language of distinction and disparagement with respect to certain features is intended to indicate a lack of preference for those features, but not to exclude such from the scope of the disclosure entirely unless otherwise indicated. All methods described herein can be performed in any suitable order unless otherwise indicated herein or otherwise clearly contradicted by context. Various features of the various embodiments disclosed herein can be combined in different combinations to create new embodiments within the scope of the present disclosure. Any ranges given herein include any and all specific values within the range and any and all ranges within the given range.

REFERENCE NUMBERS

1 Low pressure compressor
2 High pressure compressor
3 Air splitter
4 Annular combustor
5 High pressure turbine
6 Low pressure turbine
10 Air inlet
20 Air outlet
30 Engine electronic control (EEC)
31 Gear box
40 Engine health data processing unit
50 Data processing unit
51 Engine Simulation Unit (ESU)
52 Possibilistic Drift Computation Unit (PSDU)
53 Fuzzy String Generator Unit (FSGU)
54 Experience-based Matching Unit (EMU)
55 Information Fusion and Prognosis unit (IFPU)
100 Engine, turbo engine
DP30 Deviation value for high pressure compressor exit pressure
DTGT Deviation value for turbine case temperature
P0 Pressure before aircraft turbo engine
P20 Pressure at the entry of the low pressure compressor
P30 High pressure compressor exit pressure
P50 Pressure at the exit of the low pressure turbine
T0 Ambient or atmospheric temperature outside the engine
T20 Temperature at the entry of the low pressure compressor
T30 High pressure delivery temperature
T41 Temperature at the entry to the high pressure turbine
T46 Temperature at exit of the high pressure turbine
TGT Turbine gas temperature
N1 Low pressure shaft speed
N2 High pressure shaft speed
FF Fuel flow

The invention claimed is:

1. An Equipment Health Monitoring method for an engine comprising:
   a1) providing a plurality of sensors measuring engine parameter values and transmitting data regarding the engine parameter values;

a2) providing a health data processing unit, the health data processing unit receiving the transmitted data from the plurality of sensors;

a3) providing a data processing unit comprising a possibilistic drift computation unit, a fuzzy string generator unit, an experience based string matching unit, an information fusion and prognosis unit and an engine simulation unit;

a4) operatively coupling the health data processing unit to the data processing unit;

a5) providing that the possibilistic drift computation unit automatically allots an upper probability distribution to drift rates of the differences between measured and predicted values generated by the engine simulation unit, b) providing that the fuzzy string generator unit transforms a numerical sequence of upper probabilities of the drift rates generated by the possibilistic drift computation unit into a sequence of quantified terms in a fuzzy term set, c) providing that the experience-based string matching unit compares the string of terms generated by the fuzzy string generator unit with at least one other sequence or portion of sequence of previously obtained fuzzy terms in a database set to determine a degree of similarity therebetween, and d) providing that the information fusion and prognosis unit determines in dependence of the matching patterns or portions of the patterns resulting from the comparisons carried out in the experience-based string matching unit, providing a rate of engine deterioration indicating a current level of deterioration, a rate of deterioration change and a remaining useful life for a given level of deterioration or requirement or otherwise for engine maintenance or a most likely level of deterioration and a likelihood for the requirement or otherwise for engine maintenance of the engine under test;

automatically determining a maintenance schedule based on step d).

2. The Equipment Health Monitoring method according to claim 1, wherein data input to the possibilistic drift computation unit is measured with at least one parameter value at one location of the engine during engine operation, the data processing unit recording the at least one measured parameter value.

3. The Equipment Health Monitoring method according to claim 2, wherein the engine simulation unit determines how the at least one measured parameter value compares against a predicted value of a same parameter in a model-based computer simulation of the engine operating at same working conditions or extrapolated to a standardized set of conditions.

4. The Equipment Health Monitoring method according to claim 1, wherein a catalog of terms in use by the fuzzy string generator unit comprises "increased", "decreased" and "unchanged" or a finer subdivision of at least one of "increased" and "decreased".

5. The Equipment Health Monitoring method according to claim 1, wherein at least one of the terms produced by the fuzzy string generator unit is used for determining the level of engine and module deterioration.

6. The Equipment Health Monitoring method according to claim 1, and further comprising at least one chosen from using a genetic algorithm to learn sequences of fuzzy terms used by the experience-based string matching unit from historical records of data collected from maintenance operations and inspections of different engines and searching a genetically learned experience knowledge database to find nearest cases to a specific engine and a range of values is determined that bounds a life consumption estimation of the engine.

7. The Equipment Health Monitoring method according to claim 1, wherein the measured engine parameter values comprise at least one chosen from temperature, pressure, speed, vibration, frequency, fuel flow and noise data.

8. The Equipment Health Monitoring method claim 1, wherein the engine is a turbo engine, an aircraft turbo engine, a wind turbine, a static engine, a turbine generator, an engine or generator on a boat, a combustion engine or another system which sustains deterioration over time and parameters are measured.

9. The Equipment Health Monitoring method according to claim 8, and further comprising using as engine parameter values at least one chosen from pressure at an entry of the turbo engine, pressure at an entry of a low pressure compressor, exit pressure of a high pressure compressor, exit pressure of a low pressure turbine, ambient or atmospheric temperature outside the engine, temperature at the entry of the low pressure compressor, high pressure delivery temperature, turbine gas temperature, temperature at an entry to a high pressure turbine, low pressure shaft speed, high pressure shaft speed, and fuel flow.

10. The Equipment Health Monitoring method according to claim 1, wherein the engine parameter values are measured at at least one chosen from a stable cruise condition, after take-off and after climb.

11. The Equipment Health Monitoring method according to claim 1, wherein a prognostic report is generated in dependence of the experience-based matching unit results in an automatic notification of at least one chosen from a level of maintenance, level of deterioration, time until a certain level of deterioration and cost assessment.

12. The Equipment Health Monitoring method according to claim 1, wherein a temporal sequence of at least one of the measured engine parameter values is used by at least one chosen from the engine simulation unit, the possibilistic drift computation unit, the fuzzy string generator unit, the experienced-based string matching unit and the information fusion and prognosis unit.

13. The Equipment Health Monitoring method according to claim 1, and further comprising at least one chosen from using genetic learning algorithms to process EHM data of a large sample of engines to generate a knowledge database of time specific sequences associated to specific levels or types of deterioration, matching each chain in a genetically pruned database to a chain computed for the engine under test and identifying closest sample engines or combining RULs of nearest engines in the database to carry out a prognostic assessment of engines based on a most likely or similar level of deterioration rate of change, based on a service knowledge database of engines previously assessed in a same form.

14. An Equipment Health Monitoring system, comprising:
a plurality of sensors measuring engine parameter values and transmitting data regarding the engine parameter values;
a health data processing unit, the health data processing unit receiving the transmitted data from the plurality of sensors;
a data processing unit comprising a possibilistic drift computation unit, a fuzzy string generator unit, an experience based string matching unit and an information fusion and prognosis unit;

wherein the health data processing unit is coupled to the data processing unit;

an engine simulation unit configured to determine how at least one measured engine parameter value compares against at least one predicted value of a same parameter in a model-based computer simulation of the engine, and assigns at least one quantified fuzzy term to an upper probability of drift of the difference between the measured engine parameter value and the predicted value, and wherein the possibilistic drift computation unit is configured to automatically allot an upper probability distribution to drift rates of the differences between measured and predicted values generated by the engine simulation unit, wherein the fuzzy string generator unit is configured to transform a numerical sequence of upper probabilities of the drift rates generated by the possibilistic drift computation unit into a sequence of quantified terms in a fuzzy term set, wherein the experience-based string matching unit is configured to compare the string of terms generated by the fuzzy string generator unit with at least one other sequence or portion of sequence of previously obtained fuzzy terms in a database set to determine a degree of similarity therebetween, wherein the information fusion and prognosis unit determines in dependence of the matching patterns or portions of the patterns resulting from the comparisons carried out in the experience-based string matching unit, providing a rate of engine deterioration indicating a current level of deterioration, a rate of deterioration change and a remaining useful life for a given level of deterioration or requirement or otherwise for engine maintenance or a most likely level of deterioration and a likelihood for the requirement or otherwise for engine maintenance of the engine under test, wherein the experience knowledge database string matching unit is configured to compare the string of terms generated by the fuzzy string generator unit with information stored in a database populated with a genetic learning algorithm and in dependence of values resulting from the comparison to the signal generated by an information fusion and prognosis unit indicating the associated status monitored, which may be the current level of engine deterioration, a level of required maintenance, or the rate of deterioration change of the engine under test;

the data processing unit configured to automatically determining a maintenance schedule based on output from the experience knowledge database string matching unit.

15. The Equipment Health Monitoring method according to claim 1, and further comprising providing an engine electronic control which includes the health data processing unit.

16. An aircraft turbo engine, interacting with the Equipment Health Monitoring system according to claim 14.

17. The Equipment Health Monitoring system according to claim 14, and further comprising an engine electronic control which includes the health data processing unit.

* * * * *